(12) United States Patent
Helton et al.

(10) Patent No.: US 7,687,147 B2
(45) Date of Patent: Mar. 30, 2010

(54) COMPOSITE ARTICLE PROVIDING BLAST MITIGATION AND METHOD FOR MANUFACTURING SAME

(75) Inventors: Irvin Daniel Helton, Des Moines, WA (US); Michael S. Cork, Richardson, TX (US)

(73) Assignee: Specialty Products, Inc., Lakewood, WA (US)

( * ) Notice: Subject to any disclaimer, the term of this patent is extended or adjusted under 35 U.S.C. 154(b) by 708 days.

(21) Appl. No.: 11/150,717

(22) Filed: Jun. 10, 2005

(65) Prior Publication Data

US 2010/0015452 A1 Jan. 21, 2010

Related U.S. Application Data

(60) Provisional application No. 60/613,850, filed on Sep. 27, 2004, provisional application No. 60/611,124, filed on Sep. 15, 2004.

(51) Int. Cl.
*B32B 27/40* (2006.01)

(52) U.S. Cl. .............. 428/423.1; 428/425.1; 428/425.8; 528/59; 528/60; 528/65; 528/67; 528/85

(58) Field of Classification Search ............ 528/59, 528/60, 65, 67, 85; 428/423.1, 425.1, 425.8
See application file for complete search history.

(56) References Cited

U.S. PATENT DOCUMENTS

| | | | |
|---|---|---|---|
| 4,594,290 A | 6/1986 | Fischer et al. | |
| 4,786,703 A | 11/1988 | Starner et al. | |
| 5,160,776 A | 11/1992 | Li et al. | |
| 5,162,481 A * | 11/1992 | Reid et al. | 528/48 |
| 5,334,670 A | 8/1994 | Uchida et al. | |
| 5,480,955 A | 1/1996 | Primeaux, II | |
| 5,504,181 A | 4/1996 | Primeaux, II | |
| 5,554,713 A * | 9/1996 | Freeland | 528/76 |
| 5,595,701 A | 1/1997 | MacGregor et al. | |
| 5,798,409 A | 8/1998 | Ho | |
| 6,013,755 A | 1/2000 | Primeaux, II et al. | |
| 6,050,208 A | 4/2000 | Kennedy | |
| 6,127,505 A | 10/2000 | Slagel | |
| 6,403,752 B1 | 6/2002 | House et al. | |
| 6,568,310 B2 | 5/2003 | Morgan | |
| 6,630,249 B2 | 10/2003 | Kennedy | |
| 6,790,537 B1 | 9/2004 | Bartz | |
| 6,797,789 B2 | 9/2004 | Davis et al. | |
| 6,862,847 B2 | 3/2005 | Bigelow | |
| 2002/0088340 A1 | 7/2002 | Chu et al. | |
| 2003/0017129 A1 | 1/2003 | Maleeny et al. | |
| 2003/0096935 A1 | 5/2003 | Nagpal | |
| 2003/0105265 A1 | 6/2003 | McDonald | |
| 2003/0158369 A1 | 8/2003 | Slagel | |
| 2004/0123541 A1 | 7/2004 | Jewett | |
| 2004/0132849 A1 | 7/2004 | Burdeniuc et al. | |
| 2004/0229995 A1 | 11/2004 | Wu et al. | |
| 2005/0049367 A1 | 3/2005 | Rajagopalan et al. | |
| 2005/0059793 A1 | 3/2005 | Lutz et al. | |

FOREIGN PATENT DOCUMENTS

WO PCT/US2005/034783 8/2006

* cited by examiner

*Primary Examiner*—John Cooney
(74) *Attorney, Agent, or Firm*—Scott T. Griggs; Griggs Bergen LLP

(57) ABSTRACT

A composite article and method for manufacturing the same are disclosed. In one embodiment, a polyurethane-polyurea layer is disposed on a substrate. The polyurethane-polyurea layer includes a reaction product of an isocyanate component having from about 10% to about 90% of a toluene diisocyanate, by weight of the isocyanate component, and an isocyanate-reactive component having amine-terminated and/or hydroxyl-terminated compounds. The polyurethane-polyurea layer provides blast and fragment protection from explosive devices as well as ballistic mitigation.

16 Claims, 3 Drawing Sheets

COMPOSITE ARTICLE PROVIDING BLAST MITIGATION AND METHOD FOR MANUFACTURING SAME

PRIORITY STATEMENT & CROSS-REFERENCE TO RELATED APPLICATIONS

This application claims priority from (1) U.S. Patent Application No. 60/611,124, entitled "Polyurethane-polyurea Polymer" and filed on Sep. 15, 2004, in the name of Michael S. Cork and (2) U.S. Patent Application No. 60/613,850, entitled "Composite Article Having an Elastomeric Layer" and filed on Sep. 27, 2004, in the names of Dan Helton and Michael S. Cork; both of which are hereby incorporated by reference for all purposes.

TECHNICAL FIELD OF THE INVENTION

This invention relates, in general, to mitigation measures for explosive blast threats and, in particular, to a composite article having a substrate and a polyurethane-polyurea layer disposed thereon to provide blast and fragment protection from explosive devices.

BACKGROUND OF THE INVENTION

Mitigation measures for explosive blast threats are applicable to combat theater operations, potential civilian terrorist targets, and potential sites of accidental explosions. Accordingly, blast mitigation measures are being utilized in military, government, business, and industrial applications to avoid casualties, reduce damage to infrastructure, and remain operational in the event of an explosion.

Existing mitigation measures for explosive threats include maximizing the stand-off distance between the target and potential explosives and hardening the target's envelope. However, often it is not possible to maximize the stand-off distance. This is particularly true with respect to military applications, such as combat vehicles, and civil applications, such as buildings in urban settings. Hence, there is a need for mitigation measures that harden a potential target's envelope and a greater need for such measures in instances where it is not possible to maximize the stand-off distance.

SUMMARY OF THE INVENTION

A composite article and method for manufacturing the same are disclosed that provide for blast and fragment protection from explosive devices. In one embodiment, a polyurethane-polyurea layer is disposed on a substrate. The polyurethane-polyurea layer includes a reaction product of an isocyanate component having from about 10% to about 90% of a toluene diisocyanate, by weight of the isocyanate component, and an isocyanate-reactive component having amine-terminated and/or hydroxyl-terminated compounds. In the event of an explosion near a structure utilizing the composite article, the composite article mitigates damage to the structure by minimizing the field of debris and, in particular, minimizing the amount of debris which reaches the interior of the structure.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 1A:
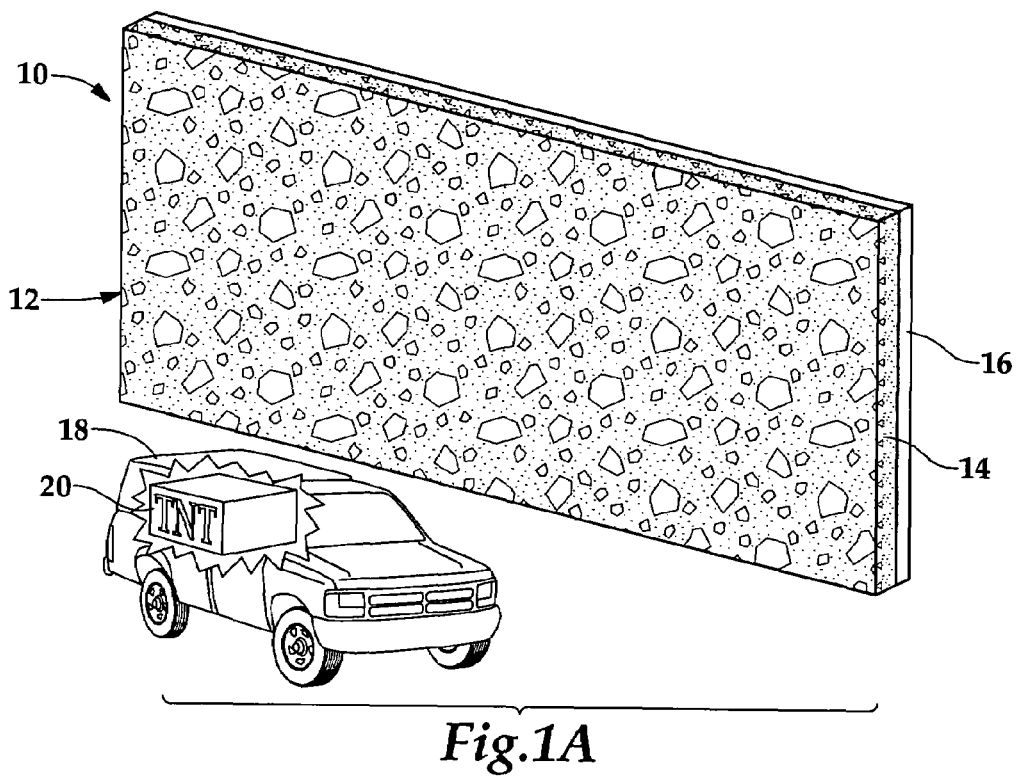
FIG. 1A depicts a schematic diagram of a target prior to an explosive event wherein one embodiment of a composite article providing blast mitigation is being utilized.

Referring initially to FIG. 1A, wherein a target, which is depicted as structure 10, is illustrated prior to an explosive event. The structure 10 includes one embodiment of a composite article 12 that provides blast mitigation. As will be discussed hereinbelow, although the structure is depicted as an aggregate wall, the composite article 12 may form a portion of any type of vehicle or structure.

The composite article includes a substrate 14 having a polyurethane-polyurea elastomer 16 disposed thereon. In one implementation, the polyurethane-polyurea elastomer comprises a reaction product of an isocyanate component having from about 10% to about 90% of a toluene diisocyanate, by weight of the isocyanate component, and an isocyanate-reactive component having amine-terminated and/or hydroxyl-terminated compounds. A threat, which is depicted as a truck 18, having explosive material 20 therein is positioned in blast proximity of the composite article 12. The explosives 20 may be low explosives which burn through deflagration, high explosives which detonate, or other types of materials that are able to generate blasts.

Figure 1B:
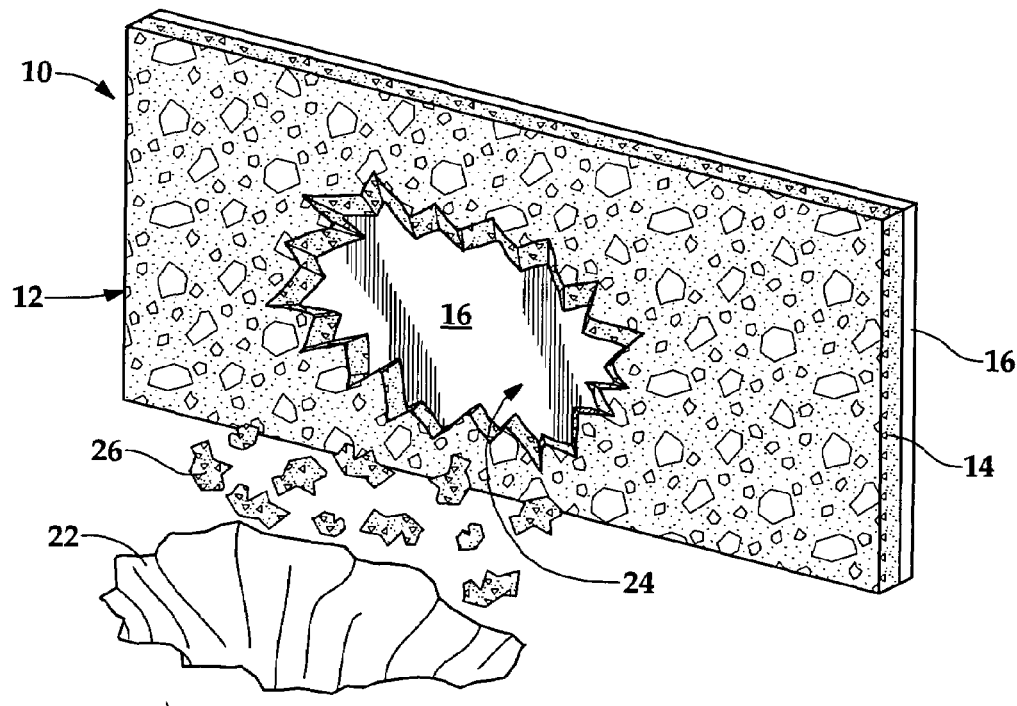
FIG. 1B depicts a schematic diagram of the target of FIG. 1A in the aftermath of the explosive event.

FIG. 1B depicts the target 10 of FIG. 1A in the aftermath of the explosive event. Following an initiation sequence, the explosive material 20 in the truck 18 explodes rapidly evolving gases and generating heat and high pressure.

The subsequent blast destroys truck 18 leaving a crater 22 and impacts structure 10 damaging substrate 14, forming impact zone 24, and causing debris 26. As impact zone 24 reveals, the polyurethane-polyurea layer 16 is intact and the composite article 12 mitigates damage to the structure 10 by minimizing the field of debris and, in particular, preventing debris 26 from reaching the interior of the structure 10. The composite article therefore provides blast and fragment protection from explosive devices and protects the lives of the occupants of structure 10 as well as the interior of structure 10.

Figure 2:
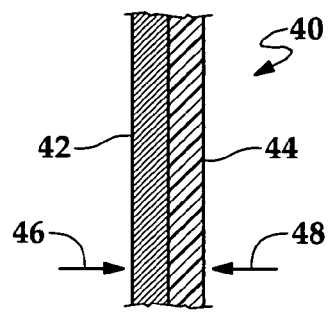
FIGS. 2 through 8 depict cross-sectional views of various exemplary embodiments of composite articles providing blast mitigation in accordance with the teachings presented herein.

FIGS. 2 through 8 depict various exemplary embodiments of composite articles providing blast mitigation in accordance with the teachings presented herein. More specifically, FIG. 2 depicts a composite article 40 having a substrate 42 with a polyurethane-polyurea layer 44 disposed thereon. As illustrated by arrow 46, the composite article 40 may be oriented such that the substrate 42 faces the direction of the anticipated impact or, in the alternative, as illustrated by arrow 48, the composite article 40 may be oriented such that the polyurethane-polyurea layer 44 faces the direction of anticipated impact.

As previously alluded to, the composite article may form a portion of any type of vehicle or fixed structure. With respect to vehicles, the composite article may form a portion of a military vehicle, such as a High Mobility Multipurpose Wheeled Vehicle (HMMWV) or tank, for example, or a civilian vehicle, such as a plane, a tanker, or rail container, for example. With respect to fixed structures, by way of example, the composite article may form a portion of a wall, floor, roof, exterior ceiling, interior ceiling, dike, dam, reservoir, containment wall, Jersey barrier, barricade, bunker, bridge, roadway, aqueduct, or flume. The composite article may also form portions of other types of structural elements such as beams, columns, and piers, for example. Further, the substrate may be any type of ceramic, composite, concrete, construction board (e.g., particle board), earth building, glass, metal, polymer, or wood material.

Figure 3:
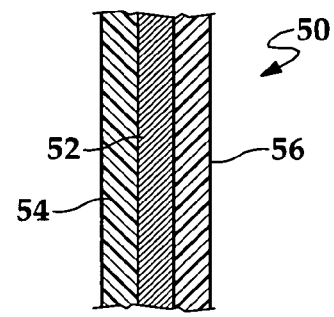

FIG. 3 depicts a composite article 50 having a substrate 52. Polyurethane-polyurea layers 54 and 56 are disposed on the two respective surfaces of the substrate 52. The polyurethane-polyurea layers 54 and 56 may be substantially identical materials or comprise different materials. Further, either polyurethane-polyurea layer 54 or 56 may be oriented in the direction of anticipated impact.

Figure 4:
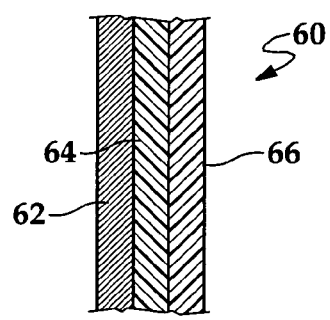

FIG. 4 depicts a composite article 60 having a substrate 62 and two layers of polymer 64 and 66 disposed thereon. Either substrate 62 or polyurethane-polyurea layer 66 may be oriented in the direction of anticipated impact. By way of example, in one implementation, the polymer layer 64 may be a primer and the polymer layer 66 may be the polyurethane-polyurea layer of the present invention. By way of another example, the polymer layer 64 may be the polyurethane-polyurea layer of the present invention and the polymer layer 66 may be a flame retardant layer.

Figure 5:
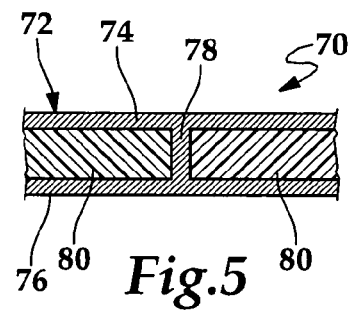
Figure 6:
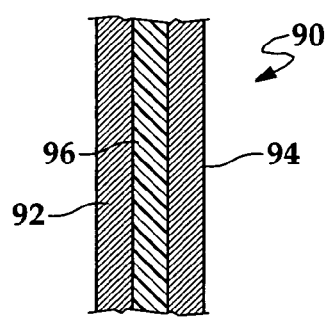

FIG. 5 depicts a composite article 70 having a substrate 72 which includes faces 74 and 76 connected by a web 78. A polyurethane-polyurea layer 80 is disposed in the interior of the substrate 72 between the faces 74 and 76. FIG. 6 depicts a composite article 90 wherein substrates 92 and 94 are adhered together by a polyurethane-polyurea elastomer 96. It should be understood that the substrates 92 and 94 may be different materials. For example, substrate 92 may be an armoring element and substrate 94 may be a reinforcing element. More specifically, substrate 92 may be a pane of ballistic mitigating glass and substrate 94 may be a pane of ordinary glass.

Figure 7:
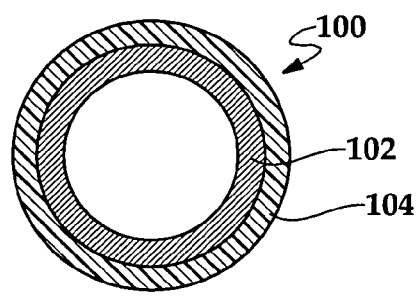
Figure 8:
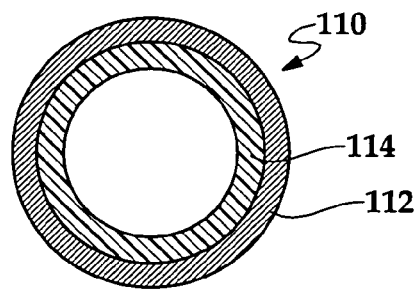

FIG. 7 depicts a composite article 100 having a tubular substrate 102 and a polyurethane-polyurea layer 104 on disposed on the outside thereof. On the other hand, FIG. 8 depicts a composite article 110 having a tubular substrate 112 and a polyurethane-polyurea layer 114 disposed on the inside thereof. As previously alluded to and as FIGS. 5-8 illustrate, the size and shape of the substrate may vary. By way of additional example, the substrate may have angular and geometric portions that form a part of a geodesic structure or silo.

Figures 9, 10:
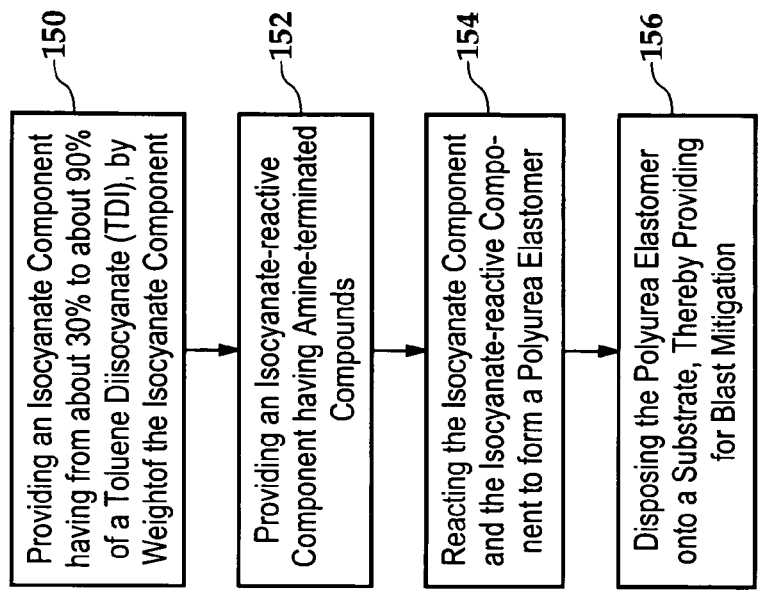
FIG. 9 depicts a schematic diagram of one embodiment of a system for manufacturing a composite article providing blast mitigation.
FIG. 10 depicts a flow chart of one embodiment of a method for manufacturing a composite article providing blast mitigation.

FIG. 9 depicts a schematic diagram of one embodiment of a system 120 for manufacturing a composite article providing blast mitigation. Before continuing with the description of FIG. 9 and the plural component spray equipment 122, the chemistry of the polyurethane-polyurea coating, which may be a polyurethane, polyurea or hybrid thereof, will be described in further detail. The polyurethane-polyurea coating may be formulated as an A-side, which may be referred to as a polyisocyanate prepolymer, isocyanate component, or polyisocyanate prepol component, and a B-side, which may be referred to as a resin or isocyanate-reactive component.

The polyisocyanate prepolymer comprises the reaction product of at least one polyisocyanate with a reactive component. In one embodiment, the polyisocyanate prepolymer incorporates a toluene diisocyanate (TDI) prepolymer component which may be the only polyisocyanate or one of a plurality of polyisocyanates. Additionally, the polyisocyanate prepolymer component has an NCO group content of about 3% to about 50% and an average functionality of about 2 to about 3.

The TDI prepolymer component comprises from about 10% to about 90% of a TDI and from about 10% to 90% of a polyol, by weight of the TDI prepolymer component. The functionality of the polyol is from about 2 to about 3 and is selected such that the TDI prepolymer has an NCO group content from about 1.5% to about 14%, a viscosity from about 5,000 cps at 158° F. (70° C.), a residual free monomeric TDI content of less than about 0.5%, and an oligomer content less than about 40%.

In one implementation, the TDI prepolymer component reaction products are prepared using organic polyisocyanates such as TDI and diphenylmethane diisocyanates (MDIs). Preferred TDIs are the 2,4- and 2,6-TDIs, individually or together as their commercially available mixtures. Preferred MDIs are the 2,4'- and 4,4'-MDIs, individually or together as their commercially available mixtures.

The TDI isomer ratio (ratio of 2,4-TDI to 2,6-TDI) used in the production of the low free monomer prepolymer of the present invention is determined by the availability and cost of the particular isomer ratio and the method used in the production. There are three commonly available 2,4/2,6 isomer ratios: the 80/20; 65/35; and the >95% isomer ratios; respectively. The most thermodynamically stable isomer ratio of TDI, and therefore the most widely available and lowest in cost, is the 80/20 isomer ratio of 2,4-TDI to 2,6-TDI. Preferably, the isomer ratio of TDI in the present invention is from about 65% to about 100% of 2,4-TDI and from about 0% to about 35% of 2,6-TDI, and more preferably about 80% of 2,4-TDI and about 20% of 2,6-TDI, by weight. Isomer ratios within the reactive mixture may be freely adjusted in order to provide the desired isomer ratio in the product.

The amount of TDI present in the TDI prepolymer component of the present invention is from about 10% to about 90%, and more preferably from about 30% to about 90%, by weight of the TDI prepolymer. Even more preferably, the range is from about 50% to about 90% by weight of the TDI prepolymer.

The polyisocyanate, e.g., TDI, is normally reacted with a polyether polyol or a polyester polyol to prepare the TDI prepolymer components. As used herein, the term "polyol" refers to a single polyol or a blend of polyols. The hydroxyl-terminated polyethers are typically polyalkylene ether glycols such as poly(ethylene ether) glycol, poly(propylene ether) glycol, and polytetramethylene ether glycol. Other polyethers are prepared by the copolymerization of cyclic ethers, such as ethylene oxide, propylene oxide and trimethylene oxide with various aliphatic diols such as ethylene glycol, butane diols, e.g., 1,3- and 1,4-butane diols, and the like, and combinations thereof, prepared by either block or random copolymerization. Polyester polyols can also be used for producing the polyurethane prepolymers, and these would include hydroxyl terminated polyesters such as polyethylene adipate, polypropylene adipate, polybutylene adipate, poly-hexamethylene adipate and copolyesters prepared by copolymerizing ethylene glycol and propylene glycol with the above polyesters, which include poly(1,4-butyleneethylene) adipate and poly(1,4-butylene-propylene) adipate. The polyol backbone may also be poly(caprolactone). The polyether and polyester polyols may also be blended such that the polyol composition (single or blend) used in making the prepolymer typically has an average Mn range consistent with a TDI content of 5-60% is about 250 to 11000. A backbone Mn range consistent with a TDI content of 10-50% is from about 350 to 4800 with a functionality of 2 to 3.

Combinations of polyols can be used to tailor properties both of the prepolymer, the spray polyurethane-polyurea, and the finished polyurethane-polyurea. Lower molecular weight components such as diethylene glycol, tripropylene glycol, and trimethylol propane may also be incorporated into the polyol blend to be used in the prepolymer manufacture.

Preferably, the polyol is selected from the group consisting of the poly(tetramethylene glycol), poly(propylene glycol), ethylene oxide capped poly(propylene glycol), poly(ethylene glycol), poly(ethylene adipate), poly(propylene adipate), poly(butylene adipate), poly(caprolactone), diethylene glycol, tripropylene glycol, trimethylol propane, and mixtures thereof.

The polyol is present in the TDI prepolymer in an amount from about 15% to about 90%, preferably from about 25% to about 90%, more preferably from about 35% to about 90%, and most preferably from about 50% to about 90%, by weight of the TDI prepolymer.

The functionality of the polyol, or a mixture thereof, used to prepare the TDI prepolymer, and therefore the functionality of the TDI prepolymer itself, may be between 2 and 3. Functionalities less than 2 tend to leave undesirable chain ends and functionalities greater than 3 typically reduce the flexibility of the finished elastomer beyond the useful range for the type of elastomeric material described herein. A TDI prepolymer having a functionality greater than 3 may be employed providing that the functionality in the finished A-side is within the desired 2 to 3 range in the polyurethane-polyurea spray system.

The NCO group content of the TDI prepolymer is from about 1.5% to about 14%, preferably from about 1.5% to about 13%, more preferably from about 2% to about 12.5%, and most preferably from about 2.5% to about 12%. The viscosity of the TDI prepolymer is from about 50 cps to about 5,000 cps, preferably from about 50 cps to about 3,000 cps, more preferably from about 50 cps to about 1,500 cps, and most preferably from about 50 cps to about 1,000 cps at 158° F. (70° C.)

The residual free monomeric TDI content of the TDI prepolymer is less than about 0.5%, preferably less than 0.4%, more preferably less than 0.3%, and most preferably less than 0.1%. TDI prepolymers containing higher levels of residual free monomeric TDI may be employed when preparing blends providing that the finished A-side contains the above low levels of residual free monomeric TDI.

The oligomer content of the TDI prepolymer is less than about 40%, preferably less than about 30%, more preferably less than about 20%, and most preferably less than about 15%.

High oligomer levels in the TDI prepolymer tend to provide TDI prepolymers with high viscosities. The oligomer content that can be tolerated in the TDI prepolymer depends on the viscosity of the TDI prepolymer, the level of the TDI prepolymer employed in the finished A-side, and the desired viscosity of the finished A-side. Generally, the lower the level of TDI prepolymer employed, the higher viscosity (and therefore the higher oligomer content) of the TDI prepolymer that can be tolerated. At higher oligomer levels (lower NCO/OH ratios) in the TDI prepolymer, the viscosity in the prepolymer is higher which affects the amount of TDI prepolymer that can be used (lower maximum levels in general). TDI prepolymers with higher oligomer levels are useful in applications such as cast and trowelable coatings, where somewhat higher viscosities can be tolerated.

In one commonly used process to prepare a very low oligomer (<15%) and low free TDI monomer (<0.1%), the overall ratio of TDI to polyol should be high such as, for example, from about 4/1 to about 10/1, in order to provide a prepolymer with a low oligomer content. When such high TDI/polyol ratios are employed in the reaction process, generally large amounts of TDI monomer must be removed after the reaction in order to obtain a low residual monomer level. Other methods to remove TDI monomers may also be employed.

As previously discussed, the polyisocyanate prepolymer comprises the reaction product of at least one polyisocyanate with a reactive component and, in a preferred embodiment, the polyisocyanate prepolymer incorporates a TDI prepolymer component discussed hereinabove. Suitable polyisocyanates, which are compounds with two or more isocyanate groups in the molecule, that may also be included in the polyisocyanate prepolymer include polyisocyanates having aliphatic, cycloaliphatic, or aromatic molecular backbones. Examples of suitable aliphatic polyisocyanates include arlkyl diisocyanates, such as the tetramethylxylyl diisocyanates, and polymethylene isocyanates, such as 1,4-tetramethylene diisocyanate, 1,5-pentamethylene diisocyanate, hexamethylene diisocyanates (HDIs or HMDIs), 1,6-HDI, 1,7-heptamethylene diisocyanate, 2,2,4- and 2,4,4-trimethylhexamethylene diisocyanate, 1,10-decamethylene diisocyanate and 2-methyl-1,5-pentamethylene diisocyanate. Additional suitable aliphatic polyisocyanates include 3-isocyanatomethyl-3,5,5-trimethylcyclohexl isocyanate, bis(4-isocyanatocyclohexyl)methane, 3,3,5-trimethyl-5-isocyanatomethyl-cyclohexyl isocyanate, which is isophorone diisocyanate (IPDI), 1,4-cyclohexane diisocyanate, m-tetramethylxylene diisocyanate, 4,4'-dicyclohexlmethane diisocyanate, and hydrogenated materials such as cyclohexylene diisocyanate and 4,4'-methylenedicyclohexyl diisocyanate. Suitable aliphatic isocyanates also include ethylene diisocyanate and 1,12-dodecane diisocyanate.

Cycloaliphatic isocyanates that are suitable include cyclohexane-1,4-diisocyanate, cyclobutane-1,3-diisocyanate, cyclohexane-1,3-diisocyanate, 1-isocyanato-2-isocyanatomethyl cyclopentane, 1-isocyanato-3,3,5-trimethyl-5-isocyanatomethyl cyclohexane, 2,4'-dicyclohexylmethane diisocyanate, and 4,4'-dicyclohexylmethane diisocyanate.

Aromatic polyisocyanates that are suitable include phenylene diisocyanate, the aforementioned TDI, xylene diisocyanate, 1,5-naphthalene diisocyanate, chlorophenylene 2,4-diisocyanate, bitoluene diisocyanate, dianisidine diisocyanate, tolidine diisocyanate, and alkylated benzene diisocyanates generally. Methylene-interrupted aromatic diisocyanates such as the aforementioned MDI, especially the 4,4'-isomer including alkylated analogs such as 3,3'-dimethyl-4,4'-diphenylmethane diisocyanate and polymeric methylenediphenyl diisocyanate are also suitable. Suitable aromatic diisocyanates which may also be used include 3,3'-dimethoxy-4,4'-bisphenylenediisocyanate, 3,3'-diphenyl-4,4'-biphenylenediisocyanate, 4,4'-biphenylene diisocyanate, 4-chloro-1,3-phenylene diisocyanate, 3,3'-dichloro-4,4'-biphenylene diisocyanate, and 1,5-naphthalene diisocyanate.

It should be appreciated that the use of various oligomeric polyisocyanates (e.g., dimers, trimers, polymeric) and modified polyisocyanates (e.g., carbodiimides, uretoneimines) is also within the scope of the present teachings. Moreover, homopolymers and prepolymers incorporating one or more of these aliphatic, cyclic, and aromatic compounds or mixtures or reaction products thereof are suitable.

The reactive component, which may also form a portion of the A-side, may include polyols, glycols, amine-substituted aromatics, and aliphatic amines, for example. As those skilled in the art will appreciate, an excess of polyisocyanate is reacted with the reactive component such that the polyisocyanate prepolymer includes reactive NCO groups for the reaction with the isocyanate-reactive component.

The isocyanate-reactive component includes chain extenders and initiators that react with the NCO groups in the polyisocyanate prepolymer component to synthesize the polyurethane-polyurea polymer. In one embodiment, the isocyanate-reactive component may include organic compounds such as polyols, glycols, amine-substituted aromatics, and aliphatic amines, for example. In particular, the isocyanate-reactive component may include organic compounds similar to those described in connection with the reactive component hereinabove. Preferably, the isocyanate-reactive component includes amine-terminated and/or hydroxyl-terminated compounds.

The plural component spray equipment 122 meters amounts of the polyisocyanate prepolymer component and the isocyanate-reactive component such that the metered amounts are sprayed or impinged into each other in the mix head of a high-pressure impingement mixing machine using pressures between 2,000 psi and 3,000 psi and temperatures in the range of about 145° F. to about 190° F. (about 63° C. to about 88° C.). Suitable equipment includes GUSMER® H-2000, GUSMER® H-3500, and GUSMER® H-20/35 type proportioning units fitted with either a GUSMER® GX-7, a GUSMER® GX-7 400 series, or a GUSMER® GX-8 impingement mix spray gun (all equipment available from Graco-Gusmer of Lakewood, N.J.).

More specifically, the plural component spray equipment 122 includes a chamber 124 for holding a polyisocyanate prepolymer component 126. A mixing element 128 is operable to agitate the polyisocyanate prepolymer component 126. It should be appreciated, however, that in certain circumstances the mixing element 128 is not utilized in order to avoid introducing air into the polyisocyanate prepolymer component. A flowline 130 connects the chamber 124 to a proportioner 132 which appropriately meters the polyisocyanate prepolymer component 126 to a heated flowline 134 which is heated by heater 136. The heated polyisocyanate prepolymer component 126 is fed to a mix head 138.

Similarly, a chamber 154 holds an isocyanate-reactive component 156 and a mixing element 158 agitates the isocyanate-reactive component 156. A flowline 160 connects the chamber 154 to the proportioner 132 which, in turn, is connected to a heated flowline 164 having a heater 166. The heated isocyanate-reactive component 156 is provided to the mix head 138. At mix head 138, the polyisocyanate prepolymer component 126 and the isocyanate-reactive component 156 are mixed and sprayed as a mixed formulation 144 onto a substrate 140 having a surface 142 such that the mixed formulation 144 cures as polyurethane-polyurea elastomer 146. It should be appreciated that although the polyurethane-polyurea is described as being sprayed, other techniques may be used to apply the polyurethane-polyurea such as troweling, casting, pouring, caulking, low pressure static techniques, and kinetic/mechanical techniques, for example.

FIG. 10 depicts a flow chart of one embodiment of a method for manufacturing a composite article providing blast mitigation. At block 150, an isocyanate component having from about 10% to about 90% of a TDI, by weight of the isocyanate component, is provided. More preferably, an isocyanate component having from about 30% to about 90% of a TDI, by weight of the isocyanate component, is provided. At block 152, an isocyanate-reactive component having amine-terminated compounds is provided. At block 154, the isocyanate component and the isocyanate-reactive component are reacted to form a polyurethane-polyurea elastomer. At block 156, the polyurethane-polyurea elastomer is disposed onto a substrate.

The present invention will now be illustrated by reference to the following non-limiting working examples wherein procedures and materials are solely representative of those which can be employed, and are not exhaustive of those available and operative. The following glossary enumerates the components utilized in the Examples and Test Methods presented hereinbelow.

AIR PRODUCTS® TDI-based prepol is an isocyanate from Air Products and Chemicals, Inc. (Allentown, Pa.) that contains a high percentage of TDI.

BORCHI® Gol 0011 agent is a liquid flow promotor and de-aerator for solvent-containing and solvent-free epoxy resin and polyurethane coatings from Borchers GmbH (Langenfeld, Germany).

ETHACURE® 100 curing agent is diethyltoluenediamine (DETA) from Albemarle Corporation (Baton Rouge, La.).

INTERGARD® 345 epoxy primer is a two component, low VOC, high solids, fast curing epoxy primer finish from International Protective Coatings, a division of Akzo Nobel Inc. (Chicago, Ill.).

JEFFAMINE® D-230 epoxy curing agent is a 230 g/mol molecular weight polyether diamine from Huntsman LLC (Salt Lake City, Utah).

JEFFAMINE® D-400 epoxy curing agent is a 400 g/mol molecular weight polyoxypropylenediamine from Huntsman LLC (Salt Lake City, Utah).

JEFFAMINE® D-2000 epoxy curing agent is 2,000 g/mol molecular weight polyoxypropylenediamine from Huntsman LLC (Salt Lake City, Utah).

JEFFAMINE® T-5000 polyol is a primary polyether triamine of approximately 5,000 g/mol molecular weight from Huntsman LLC (Salt Lake City, Utah).

JEFFOX® PPG-230 glycol is a 230 g/mol molecular weight polyoxyalkylene glycol from Huntsman LLC (Salt Lake City, Utah).

JEFFOX® PPG-400 glycol is a 400 g/mol molecular weight polyoxyalkylene glycol from Huntsman LLC (Salt Lake City, Utah).

JEFFSOL® propylene carbonate is a propylene carbonate from Huntsman LLC (Salt Lake City, Utah).

LONZACURE® DETDA 80 is diethyltoluenediamine which is used as a chain extender from Lonza GmbH (Weil am Rhein, Germany).

LUPRANATE® MI diisocyanate is a mixture of 2,4' and 4,4' MDI typically having an NCO content of 33.2% from BASF Aktiengesellschaft (Ludwigshafen, Germany).

MONDUR® ML MDI is an isomer mixture of MDI from Bayer Corporation (Pittsburgh, Pa.) that contains a high percentage of the 2'4 MDI isomer and typically has an NCO content of 33.4%-33.6%.

PPG-2000™ polymer is a 2000 g/mol molecular weight polymer of propylene oxide from The Dow Chemical Company (Midland, Mich.).

RUBINATE® 9480 MDI is a polymeric MDI from Huntsman LLC (Salt Lake City, Utah) having an NCO content of 15.5%.

TERATHANE® PTMEG polyether glycol is a soft-segment building block available in a range of molecular weights from 250 up to 2900 from Koch Industries (Wichita, Kans.).

UNILINK™ 4200 diamine is a 310 g/mol molecular weight 2-functional aromatic diamine from Dorf Ketal Chemicals, LLC (Stafford, Tex.) (formerly from UOP Molecular Sieves (Des Plaines, Ill.)).

Example I

An A-side formulation is made by reacting 60% by weight of the A-side formulation of AIR PRODUCTS® TDI-based prepol, 23% by weight of the A-side formulation of MONDUR® ML MDI isomer mixture, and 17% by weight of the A-side formulation of PPG-4000 prepolyol. The ingredients are mixed vigorously at a speed that is short of forming a vortex. A B-side resin is formed by mixing 70% by weight of the B-side formulation of JEFFAMINE® D-2000 polyoxypropylenediamine, 20% by weight of the B-side formulation of ETHACURE® 100 curing agent, 7% by weight of the B-side formulation of JEFFAMINE® D-230 epoxy curing agent, and 3% by weight of the B-side formulation of JEFFAMINE® T-5000 polyol. The ingredients are stirred at ambient conditions until well mixed. Optionally, a tertiary type amine catalyst may be utilized to increase the rate of the reaction. The B-side resin is then complete.

The A-Side and the B-side are then processed through a GX-7 spray gun, which is manufactured by Gusmer Corporation (Lakewood, N.J.), and impinged into each other at a 1:1 ratio at 2500 psi and 170° F. (77° C.). The resulting polymer gels in approximately 10 seconds and is tack free in approximately 12 seconds.

Example II

The polyurethane-polyurea polymer was prepared substantially according to the procedures presented in Example I with the components noted in Table I. The resulting polymer gels in approximately 14 seconds and is tack free in approximately 55 seconds.

TABLE I

Polymer Formation (Example II)

| A-side | B- side |
|---|---|
| 74.1% by wt of AIR - PRODUCTS ® TDI-based Prepol | 66% by wt of JEFFAMINE ® D-2000 epoxy curing agent |
| 17.9% by wt of LUPRANATE ® MI diisocyanate | 20% by wt of ETHACURE ® 100 curing agent |
| 3% by wt of MONDUR ® ML MDI | 7% by wt of JEFFAMINE ® D-230 epoxy curing agent |
| 9% by wt of JEFFSOL ® propylene carbonate | 3% by wt of JEFFAMINE ® T-5000 polyol |
| 0.5 % by wt of Borchi ® Gol 0011 agent | 4% by wt of GLYMO ™ silane |
| | 0.5 % by wt of Borchi ® Gol 0011 agent |

Example III

The polyurethane-polyurea polymer was prepared substantially according to the procedures presented in Example I with the components noted in Table II. This polyurethane-polyurea may be considered a hybrid urethane-urea.

TABLE II

Polymer Formation (Example III)

| A-side | B-side |
|---|---|
| 71.5% by wt of TDI-based Prepol having an NCO content of 15.4% | 35.68% by wt of JEFFANINE ® D-2000 epoxy curing agent |
| 23% by wt of MONDUR ® ML MDI | 30% by wt of PPG-2000 ® polymer |
| 5% by wt of JEFFSOL ® propylene carbonate | 5.57% by wt of JEFFAMINE ® T-5000 polyol |
| 0.5 % by wt of Borchi ® Gol 0011 agent | 28.76% by wt of LONZACURE ® DETDA 80 |

Example IV

The polyurethane-polyurea polymer was prepared substantially according to the procedures presented in Example I with the components noted in Table III. This polyurethane-polyurea may be considered a urethane.

TABLE III

Polymer Formation (Example IV)

| A-side | B-side |
|---|---|
| 71.5% by wt of TDI-based Prepol having an NCO content of 15.4% | 53.1% by wt of PPG-2000 ® polymer |
| 23% by wt of MONDUR ® ML MDI | 28.19% by wt of JEFFOX ® PPG-230 glycol 30% |
| 5% by wt of JEFFSOL ® propylene carbonate | 18.4% by wt of JEFFOX ® PPG-400 glycol |
| 0.5 % by wt of Borchi ® Gol 0011 agent | 0.5% by wt of Pb catalyst |

Example V

An isocyanate blend was prepared using a commercially available MDI blend containing 50-60%, 2,4'-MDI and the remainder 4,4'-MDI. A quantity of 22.4%, by weight, of the MDI blend was mixed with a TDI prepolymer prepared from a 50:50 ratio of 2,4-TDI and 2,6-TDI reacted TERATHANE®PTMEG polyether glycol and diethylene glycol at molar NCO:OH ratio of 8:1, followed by removal of the excess TDI by thin film evaporation. The final TDI prepolymer had an NCO group of 11.0% viscosity and 158° F. (70° C.) of 500-800 cps, residual TDI monomer level of <0.1% and oligomer content, 15%. The ration of 2,4-TDI to 2,6-TDI components in the final TDI prepolymer was about 80/20. The blend of the TDI prepolymer and the MDI had an NCO group content of 16.1%.

The weight percent of polyol in the TDI prepolymer was 53% and the weight percent of the TDI in the TDI prepolymer was 47%. The weight percent of the TDI prepolymer in the prepolymer blend was 77.6% and the weight percent of the MDI component in the prepolymer blend was 22.4%. The weight percent of TDI in the prepolymer blend was 26.4% and the weight percent of the polyol in the prepolymer blend was 41.1%.

The isocyanate prepolymer mixture was spray applied to a waxed panel at a 1:1 volume ratio using an amine curative or B-side containing ETHACURE® 100 curing agent, JEFFAMINE® D-2000 epoxy curing agent and JEFFAMINE® T-5000 polyol (JEFFAMINE® T-5000 at 3-5%, balance ETHACURE® 100/JEFFAMINE® D-2000 blended to provide an amine equivalent weight of 271). Both the A-side and B-side were heated to a temperature of 160° F. (71° C.) and mixed in an impingement-style spray gun (commercially available from Gusmer, Lakewood, N.J.). The gel time was 9 seconds and the tack-free time was 19 seconds. The resultant plaque had a smooth surface and remained tacky to the touch for 3-5 minutes after spraying. The plaque was cured at 140° F. (60° C.) overnight to accelerate the testing cycle.

Example VI

An isocyanate blend was prepared using a commercially available MDI blend containing 50-60% 2,4'-MDI and the remainder 4,4'-MDI. A quantity of 36.4% of the MDI blend was mixed with a TDI prepolymer prepared from a 50:50 ration of 2,4-TDI and 2,6-TDI isomer blend reacted with a polytetramethyleneetherglycol, average molecular weight 1000 at a molar NCO:OH ratio of 8:1, followed by removal of the excess TDI by thin film evaporation. The final TDI prepolymer had a NCO group of 6.25% viscosity at 158° F. (70° C.) of 350-500 cps, residual TDI monomer level of <0.1% and oligomer content, 15%. The ratio of 2,4-TDI to 2,6-TDI components in the final TDI prepolymer and the MDI had an NCO group content of 16.1%.

The weight percent of polyol in the TDI prepolymer was 74% and the weight percent of TDI in the TDI prepolymer was 26%. The weight percent of TDI prepolymer in the prepolymer blend was 73.6% and the weight percent of the MDI component in the prepolymer blend was 26.4%. The weight percent of TDI in the prepolymer blend was 19.1% and the weight percent of polyol in the prepolymer blend was 54.5%.

The procedure described in Example V was repeated. The gel time was 9 seconds and the tack-free time was 16 seconds. The surface remained slightly tacky to the touch for 1-2 minutes. The surface was glossy with a very slight ripple. The plaque was cured at 140° F. (60° C.) overnight to accelerate the testing cycle.

Example VII

An isocyanate blend was prepared sing a commercially available MDI blend containing 50-60% 2,4'-MDI and the remainder 4,4'-MDI. A quantity of 42.1% of the MDI was blended with a TDI prepolymer prepared from a 50:50 ratio of 2,4-TDI and 2,6-TDI isomer blend reacted with a polytetramethyleneetherglycol, average molecular weight 2000, (e.g., TERATHANE® PTMEG polyether glycol) at a molar NCO:OH ratio of 8:1, followed by removal of the excess TDI by thin film evaporation. The final TDI prepolmer has a NCO group content of 3.65% viscosity at 70° C. of 850-1300 cps, residual TDI monomer level of <0.1% and oligomer content <15%. The ratio of 2,4-TDI to 2,6-TDI components in the final TDI polymer was about 80/20. The blend of the TDI prepolymer and the MDI had an NCO group content of 16.2%.

The weight percent of polyol in the TDI prepolymer was 85% and the weight percent of TDI in the TDI prepolymer was 15%. The weight percent of TDI prepolymer in the prepolymer blend was 67.9% and weight % of the MDI component in the prepolymer blend was 32.1%. The weight percent of TDI in the prepolymer blend was 10.3% and weight percent of polyol in the prepolymer blend was 57.7%.

The procedure described in Example V was repeated. The gel time was 5 seconds and the tack-free time was 10 seconds. The surface exhibited no significant surface tack immediately after spraying. The surface was glossy with a slight ripple. The plaque was cured at 140° F. (60° C.) overnight to accelerate the testing cycle.

Example VIII

An isocyanate blend was prepared using a commercially available MDI blend containing 50-60% 2,4'-MDI and the remainder 4,4'-MDI. A quantity of 30% of the MDI was blended with a TDI prepolymer prepared from a 50:50 ratio of 2,4-TDI and 2,6-TDI isomer blend reacted with a Polypropylene glycol MW 2000/tripropylene glycol 3.3/1 at a molar NCO:OH ratio of 8:1, followed by removal of the excess TDI by thin film evaporation. The final TDI prepolymer has a NCO group of 7.50% viscosity at 158° F. (70° C.) of 320-475 cps, residual TDI monomer level of <0.1% and oligomer content <15%. The ratio of 2,4-TDI to 2,6-TDI components in the final TDI prepolymer was about 80/20. The blend of the TDI prepolymer and MDI had a NCO group content of 16.0%.

The weight percent of polyol in the TDI prepolymer was 64% and the weight percent of TDI in the TDI prepolymer was 36%. The weight percent of TDI prepolymer in the prepolymer blend was 70% and the weight percent of the MDI component in the prepolymer blend was 30%. The weight percent of TDI in the prepolymer blend was 25.2% and the weight percent of polyol in the prepolymer blend was 44.8%.

The procedure described in Example V was repeated. The gel time was 6 seconds and the tack-free time was 15 seconds. The surface exhibited no significant surface tack immediately after spraying. The surface was glossy with a very slight ripple. The plaque was cured at 140° F. (60° C.) overnight to accelerate the testing cycle.

The foregoing Examples I-II and V-VIII of the present invention were tested against the following comparative examples, Examples IX-XII, which were prepared according to according to "Tuning the Properties of Polyurea Elastomer Systems using Raw Material Selection and Processing Parameter Modulation," authored by Reddinger, Jerry L. and Hillman, Kenneth M., PU Latin America 2001, International Polyurethanes Conference and Exhibition for Latin America, Conference Papers, Sao Paulo, Brazil, Aug. 28-30, 2001 (2001), P32/1-P32/7. CODEN: 69COBM CAN 137: 264227 AN 2002:357450 CAPLUS. In each of the following cases, the polyurethane-polyurea elastomer was prepared using a 1:1 volume ratio of the A-side to the B-side, weight ratio approximately 1.1-1.5/1.

TABLE IV

| MDI-based Polymer Formulation (Example IX) | |
|---|---|
| A-side | B-side |
| RUBINATE ® 9480 MDI having an NCO content of 15.4% | 65.68% by wt of JEFFAMINE ® D-2000 epoxy curing agent<br>5.57% by wt of JEFFAMINE ® T-5000 polyol<br>28.76% by wt of LONZACURE ® DETDA 80 |

The resulting Example IX polymer gels in approximately 4 seconds and is tack free in approximately 7 seconds.

TABLE V

MDI-based Polymer Formulation (Example X)

| A-side | B-side |
|---|---|
| RUBINATE ® 9480 MDI having an NCO content of 15.4% | 57.45% by wt of JEFFAMINE ® D-2000 epoxy curing agent |
| | 10.64% by wt of JEFFAMINE T-5000 polyol |
| | 10.64% UNILINK ™ 4200 diamine |
| | 21.28% by wt of LONZACURE ® DETDA 80 |

The resulting Example X polymer gels in approximately 5.5 seconds and is tack free in approximately 10 seconds.

TABLE VI

MDI-based Polymer Formulation (Example XI)

| A-side | B-side |
|---|---|
| MDI quasi prepolymer having an NCO content of 19.6% | 33.54% by wt of JEFFAMINE ® D-2000 epoxy curing agent |
| | 10% by wt of JEFFAMINE ® T-5000 polyol |
| | 20% by wt of JEFFAMINE ® D-400 epoxy curing agent |
| | 15% UNILINK ™ 4200 diamine |
| | 21.5% by wt of LONZACURE ® DETDA 80 |

The resulting Example XI polymer gels in approximately 3.5 seconds and is tack free in approximately 6.5 seconds.

TABLE VII

MDI-based Polymer Formulation (Example XII)

| A-side | B-side |
|---|---|
| RUBINATE ® 9480 MDI having an NCO content of 15.4% | 52.02% by wt of JEFFAMINE ® D-2000 epoxy curing agent |
| | 5.33% by wt of JEFFAMINE ® T-5000 polyol |
| | 29.85% UNILINK ™ 4200 diamine |
| | 12.79% by wt of LONZACUR ® DETDA 80 |

The resulting Example XII polymer gels in approximately 7 seconds and is tack free in approximately 12.5 seconds.

Test Method I. The polyurethane-polyurea polymers of the present invention synthesized in accordance with Examples I-II and V-VIII and the comparative examples, Examples IX-XII, were tested according to the standard test method for tensile properties of plastics prescribed in American Society for Testing and Materials (ASTM) D638. This test method covers the determination of the tensile properties of unreinforced and reinforced plastics in the form of standard dumbbell-shaped test specimens when tested under defined conditions of pretreatment, temperature, humidity, and testing machine speed. Table VI depicts the ASTM D638 test results for the Example I-II and V-XII polymers.

TABLE VI

ASTM D638 Test Results

| Polymer | Tensile Strength | Elongation |
|---|---|---|
| Ex. I Polymer | 5,066 psi (34.93 mpa) | 307% |
| Ex. II Polymer | 4,233 psi (29.42 mpa) | 304% |
| Ex. V Polymer | 4,091 psi (28.21 mpa) | 274% |
| Ex. VI Polymer | 4,282 psi (29.52 mpa) | 350% |
| Ex. VII Polymer | 4,295 psi (29.61 mpa) | 378% |
| Ex. VIII Polymer | 4,109 psi (28.33 mpa) | 310% |
| Ex. IX Polymer | 2,488 psi (17.15 mpa) | 467% |
| Ex. X Polymer | 2,662 psi (18.35 mpa) | 532% |
| Ex. XI Polymer | 2,772 psi (19.11 mpa) | 268% |
| Ex. XII Polymer | 2,128 psi (14.67 mpa) | 529% |

By comparison, the polyurethane-polyurea elastomers of the present invention (Examples I-II and V-VIII) have an average tensile strength of 4,346 psi (17.32 mpa) while the existing elastomers (Examples IX-XII) have an average tensile strength of 2,512 psi (17.32 mpa). Accordingly, the polyurethane-polyurea elastomers exhibited 42% greater tensile strength on average.

Test Method II. The polyurethane-polyurea polymers of the present invention synthesized in accordance with Examples I-II and V-VIII and the comparative examples, Examples IX-XII, were tested according to the standard test method for tensile (tension) properties of plastics prescribed in ASTM D412. This test method covers the determination of modulus using both dumbbell and straight section specimen test methodologies and cut ring specimen test methodologies. Table VII depicts the ASTM D412 test results for the Example I-X polymers.

TABLE VII

ASTM D412 Test Results

| Polymer | 100% Modulus | 200% Modulus | 300% Modulus |
|---|---|---|---|
| Ex. I Polymer | 1,723 psi (11.97 mps) | — | 4,806 psi (33.40 nips) |
| Ex. II Polymer | 1,757 psi (12.11 mps) | 2,608 psi (17.98 nips) | 4,000 psi (-28 nips) |
| Ex. V Polymer | 1,904 psi (13.12 mps) | 2,859 psi (19.71 nips) | — |
| Ex. VI Polymer | 1,613 psi (11.12 mps) | 2,268 psi (15.63 nips) | 3,450 psi (23.78 nips) |
| Ex. VII Polymer | 1,399 psi (9.65 mps) | 1,959 psi (13.50 nips) | 3,001 psi (20.69 nips) |
| Ex. VIII Polymer | 1,498 psi (10.33 mps) | 2,334 psi (16.09 nips) | 3,499 psi (24.12 nips) |
| Ex. IX Polymer | 1,212 psi (8.36 mps) | — | 1,823 psi (12.57 nips) |
| Ex. X Polymer | 1,173 psi (8.09 mps) | — | 1,753 psi (12.09 nips) |
| Ex. XI Polymer | 1,946 psi (13.41 mps) | — | — |
| Ex. XII Polymer | 1,027 psi (7.08 mps) | — | 1,471 psi (10.14 mps) |

By comparison, with respect to the 100% modulus, the polyurethane-polyurea elastomers of the present invention (Examples I-II and V-VIII) have an average tensile strength of 1,649 psi (11.37 mpa) while the existing elastomers (Examples IX-XII) have an average tensile strength of 1,339 psi (9.23 mpa). Accordingly, the polyurethane-polyurea elastomers exhibited 18% greater tensile strength on average. With respect to 300% modulus, the difference between the polyurethane-polyurea polymers of the present invention and the existing polymers was more pronounced. The polyurethane-polyurea polymers of the present invention exhibited 55% greater tensile strength on average.

Test Method III. The polyurethane-polyurea polymers of the present invention synthesized in accordance with Examples I and V-VIII and the comparative examples, Examples IX-XII, were tested according to the standard test method for tear resistance of conventional vulcanized rubber and thermoplastic elastomers prescribed in ASTM D624. This test method covers the determination of tear strength. Table VIII depicts the ASTM D624 test results for the Example I and III-X polymers.

TABLE IX

ASTM D624 Test Results

| Polymer | Tear Strength |
| --- | --- |
| Ex. I Polymer | 696 pli (122 kN/m) |
| Ex. V Polymer | 609 pli (107 kN/m) |
| Ex. VI Polymer | 578 pli (101 kN/m) |
| Ex. VII Polymer | 578 pli (101 kN/m) |
| Ex. VIII Polymer | 520 pli (91 kN/m) |
| Ex. IX Polymer | 505 pli (88 kN/m) |
| Ex. X Polymer | 482 pli (84 kN/m) |
| Ex. XI Polymer | 541 pli (95 kN/m) |
| Ex. XII Polymer | 456 pli (80 kN/m) |

By comparison, the tear strength for the polymers developed in accordance with the present invention was 596 pli (104 kN/m) compared to 496 pli (86.67 kN/m); namely an improvement of 16%. Accordingly, Tables IV-IX show that the TDI prepolymer blend based polyurethane-polyurea elastomers presented herein have significantly better physical properties than existing purely MDI based polyurea elastomers. The better physical properties of the polyurethane-polyurea elastomers translate into an ability to mitigate explosive blasts when utilized with a substrate as discussed above.

Test Method IV. The polyurethane-polyurea elastomer of Example II was tested to measure strength loss in relation to increased thickness. A thick sample specimen (0.2 cm) and a thin sample specimen (0.065 cm) were tested according to the ASTM D412 test methodology presented hereinabove in Test Method II as well as the ASTM D2240 test methodology for durometer hardness at two times: substantially immediately and after curing at 70° C. (158° F.) overnight. Tables X and XI depict the ASTM D412 and ASTM D2240 test results respectively for the Example II polymer.

TABLE X

ASTM D412 Test Results

| Ex. II Polymer | Ultimate Tensile Strength | Elongation | 100% Modulus | 200% Modulus |
| --- | --- | --- | --- | --- |
| Thin Immediately | 4,494 psi (30.99 mps) | 268% | 1,900 psi (13.10 mps) | 3,088 psi (21.29 mps) |
| Thin After Curing | 4,560 psi (31.44 mps) | 263% | 1,994 psi (13.75 mps) | 3,264 psi (22.50 mps) |
| Thick Immediately | 3,386 psi (23.35 mps) | 228% | 1,832 psi (12.63 mps) | 2,897 psi (19.97 mps) |
| Thick After Curing | 3,864 psi (26.64 mps) | 257% | 1,755 psi (12.10 mps) | 2,802 psi (19.32 mps) |

TABLE XI

ASTM D2240 Test Results

| Ex. II Polymer | Hardness (A/D) |
| --- | --- |
| Thin Immediately | 97/61 |
| Thin After Curing | — |
| Thick Immediately | 95/59 |
| Thick After Curing | — |

The test results demonstrate that the TDI-based polyurethane-polyurea elastomers of the present invention maintain approximately 75% of their strength in thicker sections. This property demonstrates an improvement over MDI-based polyurethane-polyurea elastomers which approach brittleness in thicker sections.

Test Method V. One specific embodiment of the polyurethane-polyurea elastomer of the present invention was tested for blast and fragment protection from explosives. Two identical 8" thick masonry walls, with nominal dimensions for 8' wide×11' tall, were constructed such that a one-way simple support span was achieved, with no rotation constraints at either the top or bottom. The wall was partitioned into a retrofitted wall structure and a control wall structure.

The internal concrete surfaces of the retrofitted reaction structure including the floor, ceiling, and side walls nearest the retrofitted wall structure were prepared with a pneumatic scabbing tool. This air-actuated tool, known as a "scabbler," removed the top mortar finish of the concrete surfaces and the treated surfaces were thoroughly vacuumed.

Optionally, a INTERGARD®345 epoxy primer may be then applied with a paint sponge roller to the outer half of the interior scabbed perimeter. Following curing of the option INTERGARD® primer, the Example II polymer was applied. Following curing of the Example II polymer, two coats of the Example III polymer were applied.

The charge and standoff was 220 pounds (100 kg) of TNT equivalent at 33 feet (10 m). The loading produced by 220 pounds of TNT at 33 feet is consistent with many military design manuals as representing the size of a typical terrorist car bomb. Consequently, this threat is commonly used by the blast community as a minimum standard of design.

The crater measured approximately 120 inches (304 cm) in diameter with a maximum depth of 23 inches (58 cm). The control wall structure suffered complete failure. The cement masonry blocks were shattered and entered the reaction structure as well as being distributed between the foot of the wall and the threat location.

The retrofitted wall structure utilizing the composite article of the present invention survived. A portion of the cement masonry blocks were shattered and disbursed between the foot of the wall and the threat location. The retrofitted wall prevented any wall debris from entering the reaction structure and the interior polyurethane-polyurea surface exhibited no discernible signs of cracks or tears. The polyurethane-polyurea surface, however, did exhibit a residual deflection.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A composite article providing blast mitigation, the composite article comprising:
   a fixed structure including a substrate, the fixed structure being subject to blast exposure, the fixed structure being selected from the group consisting of walls, floors, roofs, exterior ceilings, interior ceilings, dikes, dams, reservoirs, containment walls, Jersey barriers, barricades, bunkers, bridges, roadways, aqueducts, flumes, beams, columns, and piers; and
   a polyurethane-polyurea layer bonded to the surface of the substrate and oriented in a direction of anticipated blast exposure to provide blast and fragment protection, the polyurethane-polyurea layer including a reaction product of (a) an isocyanate component comprising a toluene diisocyanate prepolymer having from about 50% to about 90% of a toluene diisocyanate, by weight of the toluene diisocyanate prepolymer, and a polyol having a functionality from about 2 to about 3 and being selected such that the toluene diisocyanate prepolymer has an NCO group content from about 2.5% to about 12%, and (b) an isocyanate-reactive component, the reaction product being the result of impingement mixing by plural component spray equipment using pressures between about 2,000 psi and about 3,000 psi and temperatures in the range of about 145° F. to 190° F., the polyurethane-polyurea having the following characteristics:
   a gel time between 5 and 9 seconds,
   a tack-free time between 10 and 16 seconds,
   a tensile strength between 4,109 psi and 4,295 psi, and
   a tear strength of between 520 pli and 578 pli.

2. The composite article as recited in claim 1, wherein the isocyanate-reactive component comprises a compound selected from the group consisting of amine-terminated compounds, hydroxyl-terminated compounds, and blends of amine-terminated and hydroxyl-terminated compounds.

3. The composite article as recited in claim 1, wherein the substrate comprises a material selected from the group consisting of ceramics, composites, concretes, construction boards, earth building materials, glasses, metals, polymers, and woods.

4. A composite article providing blast mitigation, the composite article comprising:
   a first substrate forming a portion of a fixed structure, the first substrate being oriented in a direction of anticipated blast exposure, the fixed structure being subject to blast exposure, the fixed structure being selected from the group consisting of walls, floors, roofs, exterior ceilings, interior ceilings, dikes, dams, reservoirs, containment walls, Jersey barriers, barricades, bunkers, bridges, roadways, aqueducts, flumes, beams, columns, and piers;
   a second substrate forming a portion of the fixed structure; and
   a polyurethane-polyurea layer adhering the first substrate to the second substrate while providing blast and fragment protection, the polyurethane-polyurea layer including a reaction product of (a) an isocyanate component comprising a toluene diisocyanate prepolymer having from about 50% to about 90% of a toluene diisocyanate, by weight of the toluene diisocyanate prepolymer, and a polyol having a functionality from about 2 to about 3 and being selected such that the toluene diisocyanate prepolymer has an NCO group content from about 2.5% to about 12%, and (b) an isocyanate-reactive component, the reaction product being the result of impingement mixing by plural component spray equipment using pressures between about 2,000 psi and about 3,000 psi and temperatures in the range of about 145° F. to 190° F., the polyurethane-polyurea having the following characteristics:
   a gel time between 5 and 9 seconds,
   a tack-free time between 10 and 16 seconds,
   a tensile strength between 4,109 psi and 4,295 psi, and
   a tear strength of between 520 phi and 578 pli.

5. The composite article as recited in claim 4, wherein the isocyanate-reactive component comprises a compound selected from the group consisting of amine-terminated compounds, hydroxyl-terminated compounds, and blends of amine-terminated and hydroxyl-terminated compounds.

6. The composite article as recited in claim 4, wherein the first substrate comprises a material selected from the group consisting of ceramics, composites, concretes, construction boards, earth building materials, glasses, metals, polymers, and woods.

7. The composite article as recited in claim 4, wherein the first and second substrates comprise substantially identical materials.

8. The composite article as recited in claim 4, wherein the first and second substrates comprise different materials.

9. A method of manufacturing a composite article providing blast mitigation, the method comprising:
   providing an isocyanate component comprising a toluene diisocyanate prepolymer having from about 50% to about 90% of a toluene diisocyanate, by weight of the toluene diisocyanate prepolymer, and a polyol having a functionality from about 2 to about 3 and being selected such that the toluene diisocyanate prepolymer has an NCO group content from about 2.5% to about 12%;
   providing an isocyanate-reactive component;
   reacting the isocyanate component and the isocyanate-reactive component to form a polyurethane-polyurea elastomer, the reaction product being the result of impingement mixing by plural component spray equipment using pressures between about 2,000 psi and about 3,000 psi and temperatures in the range of about 145° F. to 190° F.;
   providing the polyurethane-polyurea elastomer with the following characteristics: a gel time between 5 and 9 seconds, a tack-free time between 10 and 16 seconds, a tensile strength between 4,109 psi and 4,295 psi, and a tear strength of between 520 phi and 578 phi; and
   disposing the polyurethane-polyurea elastomer onto a substrate, the substrate being a portion of a fixed structure subject to blast exposure, the fixed structure being selected from the group consisting of walls, floors, roofs, exterior ceilings, interior ceilings, dikes, dams, reservoirs, containment walls, Jersey barriers, barricades, bunkers, bridges, roadways, aqueducts, flumes, beams, columns, and piers.

10. The method as recited in claim 9, wherein disposing the polyurethane-polyurea elastomer onto a substrate further comprises disposing the polyurethane-polyurea elastomer onto a material selected from the group consisting of ceramics, composites, concretes, construction boards, earth building materials, glasses, metals, polymers, and woods.

11. The method as recited in claim 9, further comprising, upon manufacturing the composite article, impacting the composite article with a blast.

12. A method of manufacturing a composite article providing blast mitigation, the method comprising:

providing an isocyanate component comprising a toluene diisocyanate prepolymer having from about 50% to about 90% of a toluene diisocyanate, by weight of the toluene diisocyanate prepolymer, and a polyol having a functionality from about 2 to about 3 and being selected such that the toluene diisocyanate prepolymer has an NCO group content from about 2.5% to about 12%;

providing an isocyanate-reactive component;

reacting the isocyanate component and the isocyanate-reactive component to form a polyurethane-polyurea elastomer, the reaction product being the result of impingement mixing by plural component spray equipment using pressures between about 2,000 psi and about 3,000 psi and temperatures in the range of about 145° F. to 190° F.;

providing the polyurethane-polyurea elastomer with the following characteristics: a gel time between 5 and 9 seconds, a tack-free time between 10 and 16 seconds, a tensile strength between 4,109 psi and 4,295 psi, and a tear strength of between 520 phi and 578 phi; and disposing the polyurethane-polyurea elastomer onto a first substrate, the first substrate being a portion of a fixed structure subject to blast exposure, the fixed structure being selected from the group consisting of walls, floors, roofs, exterior ceilings, interior ceilings, dikes, dams, reservoirs, containment walls, Jersey barriers, barricades, bunkers, bridges, roadways, aqueducts, flumes, beams, columns, and piers; and adhering a second substrate to the polyurethane-polyurea elastomer such that the polyurethane-polyurea elastomer is interposed between the first substrate and the second substrate, the second substrate forming a portion of the fixed structure.

13. The method as recited in claim 12, wherein disposing the polyurethane-polyurea elastomer onto a first substrate further comprises disposing the polyurethane-polyurea elastomer onto a material selected from the group consisting of ceramics, composites, concretes, construction boards, earth building materials, glasses, metals, polymers, and woods.

14. The method as recited in claim 12, further comprising selecting the second substrate of a substantially identical material to the first substrate.

15. The method as recited in claim 12, further comprising selecting the second substrate of a different material than the first substrate.

16. The method as recited in claim 12, further comprising, upon manufacturing the composite article, impacting the composite article with a blast.

* * * * *